United States Patent

Booker, Jr. et al.

[15] 3,647,953

[45] Mar. 7, 1972

[54] SYSTEM FOR PHASING RECORDED INFORMATION WITH INPUT SIGNALS

[72] Inventors: Clyde A. Booker, Jr., Pittsburgh; Francis T. Thompson, Murrysville, both of Pa.

[73] Assignee: Westinghouse Electric Corporation, Pittsburgh, Pa.

[22] Filed: Oct. 6, 1969

[21] Appl. No.: 863,830

[52] U.S. Cl. .......... 178/6.6 A, 178/6.6 TC

[51] Int. Cl. .......... H04n 5/04, H04n 5/32, H04n 5/78

[58] Field of Search .......... 178/6.6 A, 69.5, 6.6 TC, 6.6 DD, 178/DIG. 1; 179/100.2 B

[56] References Cited

UNITED STATES PATENTS 3,017,462 1/1962 Clark et al. .......... 178/6.6 X 3,515,127 6/1970 Grace .......... 178/6.6 X

*Primary Examiner*—Bernard Konick
*Assistant Examiner*—Steven B. Pokotilow
*Attorney*—F. H. Henson, C. F. Renz and A. S. Oddi

[57] ABSTRACT

A system for correlating recorded synchronizing signals, recorded on a magnetic recording disc, for example, with alternating input signals, utilized for driving the disc for example, wherein timing signals, such as vertical blanking signals provided in response to the recorded synchronizing information, are compared with reference signals, generated, for example, in response to a predetermined characteristic of the input signals, to provide an output when an undesired relationship exists therebetween which is utilized to establish a desired relationship between the recorded synchronizing information and the input signals.

5 Claims, 4 Drawing Figures

Patented March 7 1972 3,647,953

3 Sheets-Sheet 1

INVENTORS
Clyde A. Booker, Jr. &
Francis T. Thompson.
BY
[signature]
ATTORNEY

SYSTEM FOR PHASING RECORDED INFORMATION WITH INPUT SIGNALS

BACKGROUND OF THE INVENTION

1. Field of the Invention

The present invention relates to a system for correlating stored synchronizing information with input signals and, more particularly, to such a system wherein synchronizing information is utilized for controlling the recording of video information and playback thereof.

2. Discussion of the Prior Art

In copending application Ser. No. 754,546, filed Aug. 22, 1968, a system is disclosed wherein an X-ray image is scanned by a television camera and the resulting video information is recorded on a magnetic recording disc. Synchronizing information is prerecorded on the magnetic disc and is utilized for providing synchronizing signals to the camera for controlling the horizontal and vertical scanning thereof. The recorded synchronizing information is also utilized for controlling the recording and playback of the video information recorded on the disc. A hysteresis type of synchronous motor is typically utilized for driving the magnetic disc at a constant speed of, for example, 1,800 revolutions per minute in response to a 60 Hz. input thereto. As is characteristic of such a synchronous motor it locks in at an arbitrary phase angle with respect to the 60 Hz. input each time that it is energized. Thus each time the synchronous motor is turned on it is likely that a different phase relationship will exist between the rotor (and the disc) and the 60 Hz. input.

The X-ray generator utilized is also supplied with operating power from the 60 Hz. input, and it is highly desirable that the X-ray generator be energized at a selected phase angle in the 60 Hz. input, for example, when the input AC crosses the zero axis and begins a positive half cycle. One reason for such requirement is that it prevents the undesired saturation of transformers in the power supply of the X-ray generator. Another extremely important reason for energizing the X-ray generator at a known phase angle of the input AC is for minimizing the amount of radiation received by a patient under surveillance. By knowing the phase angle at which the X-ray generator is energized, the recording operation of the X-ray image to be recorded can be accomplished in a minimum amount of time. For example, in a typical recording cycle: (1) during the first and second fields of scan at the standard vertical scanning rate of 60 Hz. the X-ray generator is energized to proper output levels and the camera automatic gain control is adjusted; (2) during the third and fourth fields of scan any previous video information recorded on the recording disc is erased and (3) during the fifth and sixth fields of scan the new video information corresponding to the X-ray image is recorded on the disc. Thus a total of six one-sixtieth of a second fields of scan (6 cycles of the input 60 Hz. source) are required for the entire recording operation of a selected X-ray image. This recorded output then may be repetitively played back for display on a suitable monitor. By correlating the 60 Hz. input driving the synchronous motor and the recording disc and also supplying the X-ray generator to have a proper time relationship with the synchronizing information recorded on the disc the exposure of the patient to X-rays can be minimized and also saturation of the power supply transformers can be prevented.

SUMMARY OF THE INVENTION

Broadly the present invention provides a system for correlating recorded synchronizing information with input signals by the comparison of signals generated respectively in response thereto to establish a desired relationship therebetween when an undesired relationship is detected.

DESCRIPTION OF THE PREFERRED EMBODIMENT

Figures 1, 1A:
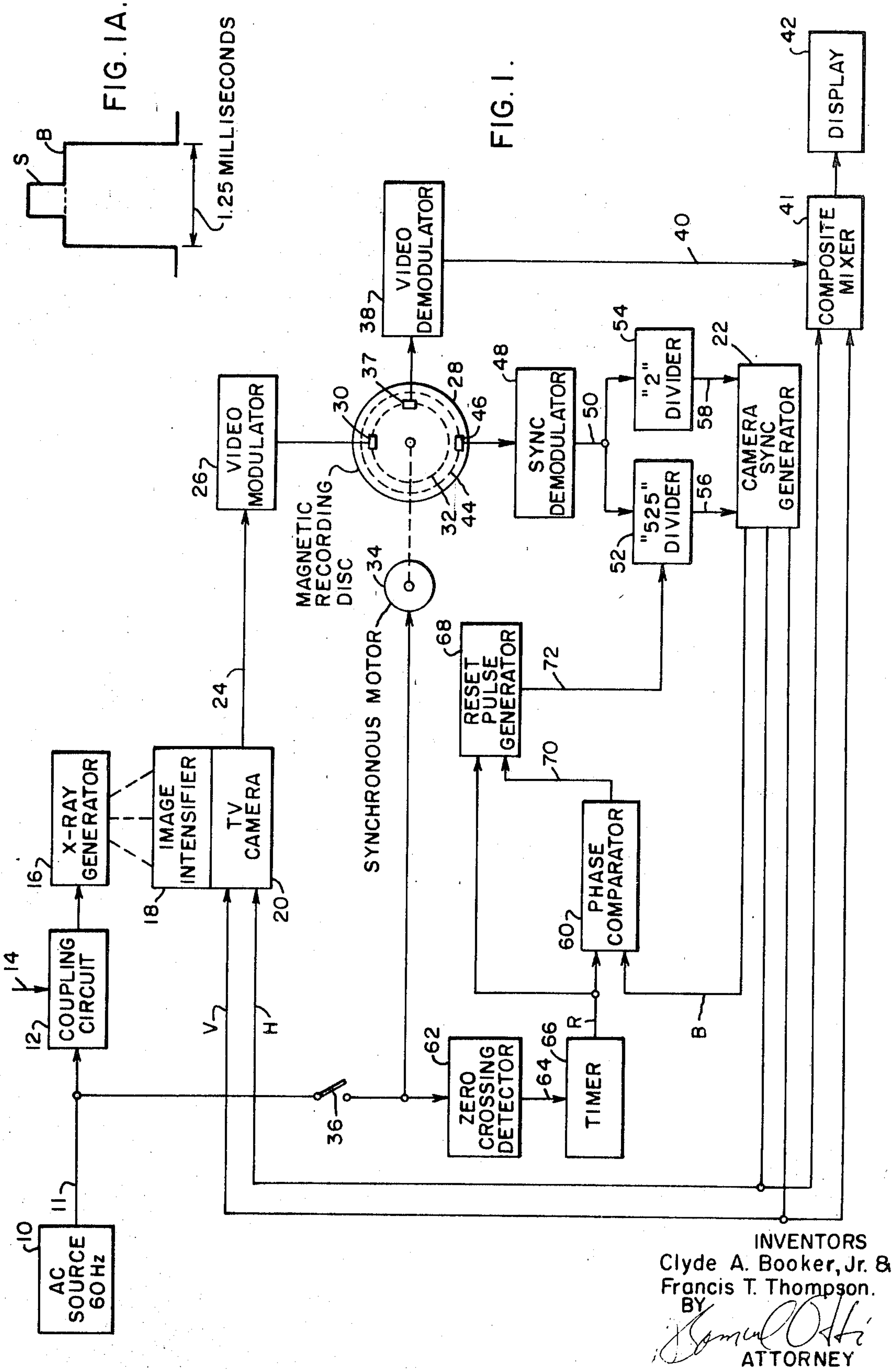
FIG. 1 is a block diagram of the system of the present invention.
FIG. 1A is a diagram of a camera vertical sync generator pulse.

Referring to FIG. 1, a 60 Hz. alternating current source 10 is utilized as the operating source for the present system. The 60 Hz. output 11 of the AC source 10 is applied to a coupling circuit 12 which is responsive to an input 14 thereto to translate the output 11 of the source 10 to an X-ray generator 16 for the energization thereof. The coupling circuit 12 in response to the input thereto is ideally adapted to supply the 60 Hz. output 11 to energize the X-ray generator 16 at a predetermined phase of the 60 Hz. output, for example, at the zero crossing point as the sinusoidal waveform starts into its positive half cycle.

Upon being energized the X-ray generator 16 supplies an X-ray image output. The X-ray image output is intensified in an image intensifier 18 which is coupled to the input of a television camera 20. The camera 20 scans the amplified X-ray image, for example, at the standard horizontal scanning rate of 15,750 Hz. and the standard vertical scanning rate of 60 Hz. Horizontal and vertical synchronizing and blanking signals are supplied to the camera 20 as inputs H and V, respectively, from a camera sync generator 22. The generation of the horizontal signals H and vertical signals V will be discussed in detail below.

The TV camera 20 supplies a video output 24 corresponding to the X-ray image input under the control of the horizontal and vertical signals H and V, respectively. The video output 24 is supplied to a modulator 26 which comprises a frequency modulator, for example. In the modulator 26 the video input 24 thereto is utilized to modulate a carrier frequency which is selected to have a frequency within the bandwidth of the recording media which in the present example is shown to be a magnetic recording disc 28. The output of the modulator 26 thus comprises frequency modulated signals modulated in accordance with the video input 24 thereto. The FM signals are recorded on the disc 28 via a recording head 30 onto a track 32 of the disc 28.

The disc 28 is driven at a constant speed, for example, 1,800 revolutions per minute, by a synchronous motor 34 which may comprise a hysteresis type of synchronous motor. The motor 34 receives its electrical input from the AC source 10 by the closing of a start switch 36. When the synchronous motor 34 is energized from the source 10 the rotor thereof will be locked in a fixed phase relationship with the phase of the output 11 of the AC source 10. The phasing of the rotor of the synchronous motor 34 and the phase of the AC output will vary according to the closing time of the switch 36 in the cycle of the AC output 11. It is then a primary object of the present invention to insure that a predetermined phase relationship is established and maintained between the AC output 11 and synchronizing information regardless of the phasing of the rotor of the motor 34.

In order to playback the recorded frequency modulated signals recorded on the track 32 of the disc 28, a playback head 37 is utilized to transduce the recorded information on the disc 28 to electrical signals which are applied to a demodulator 38. The demodulator 38 comprises a frequency demodulator which demodulates the original video intelligence corresponding to the video output 24 from the TV camera 20. The demodulated output 40 of the demodulator 30 is applied to a display 42. The display 42 may comprise a television monitor which also receives the V and H inputs from the camera sync generator 22 and thus displays as a standard television raster the originally recorded X-ray image.

Synchronizing information is prerecorded on the disc 28 on a synchronizing track 44 to provide the necessary synchronizing information for the TV camera 20 and the recording and display operations as described. The synchronizing information recorded on the track 44 comprises frequency modulated signals wherein a carrier frequency is modulated with a fixed reference frequency, for example, 31.5 kHz. The carrier frequency utilized for recording the synchronizing information may be lower than that utilized for recording the video information because of the less stringent bandwidth requirements for the synchronizing information. A playback head 46 is provided for the sync track 44 and is operative to sense the synchronizing information and convert it to electrical signals for application to a sync demodulator 48. The sync demodulator 48 is operative to demodulate the frequency modulated signals corresponding to the original 31.5 kHz. signal recorded on the synchronizing track 44. The output 50 of the sync demodulator 44 is an output signal having a frequency of 31.5 kHz. which ideally may have a substantially square waveform at the clock frequency of 31.5 kHz.

The output 50 of the sync demodulator 48 is applied to a "525"divider 52 and also a "2" divider 54. The "525" divider 52 is operative to divide the 31.5 kHz. clock input by 525 so as to provide an output 56 having a frequency of 60 Hz. which is the vertical scanning rate. The "525" divider 52 operates as a pulse counter providing an output of one pulse for each 525 inputted thereto. The "2" divider 54 divides the 31.5 kHz. sync signal by 2 so as to provide a 15.75 kHz. output 58 which is at the horizontal line scanning rate. The 60 Hz. and 15.75 kHz. signals are applied, respectively, to the camera sync generator 22. In response to the 60 Hz. input 56 the camera sync generator 22 supplies vertical signals V such as shown in FIG. 1A at the 60 Hz. rate and having the standard waveform including a vertical blanking portion B and a vertical synchronizing portion S. The synchronizing pulses S ride on the blanking pedestal B with the amplitude of the blanking pulses being sufficient to cut off the electron beam flow in either the television camera 20 or the display 42 during the time period the blanking pulses occur. The blanking pulses B have a time duration of approximately 1.25 milliseconds which is commonly called the vertical retrace time when the electron beam is retraced from the lower right corner of the field of scan to the top left corner of a new field of scan.

The camera sync generator 22 in response to the 15.75 kHz. input 58 thereto supplies horizontal signals H which include synchronizing pulses and occurring at the horizontal line rate and also a blanking pulse upon which the horizontal sync pulse is impressed with the blanking pulse blanking the tv camera 20 and the display 22 when the electron beam is being returned from the end of one line of scan to the beginning of the next line of scan.

The camera sync generator 22 also supplies an output B which comprises only the vertical blanking pulses such as shown at B in FIG. 1A. The pulses B thus have a substantially square wave shape and have a time duration of 1.25 milliseconds with the sync portion S not being impressed thereon. The vertical blanking pulses B are applied as one input to a phase comparator 60 which forms a part of the present phasing control system.

When the switch 36 is closed to activate the motor 34 the 60 Hz. output 11 of the AC source 10 is also applied to a zero-crossing detector 62. The zero-crossing detector 62 is responsive to the AC output 11 crossing the zero axis for example from a negative to a positive polarity to supply an output 64 at the time of the crossing to a timer 66 which begins to time out from the time of the zero crossing. At the end of the timing period of the timer 66, it provides a reference output pulse R to the phase comparator 60 and also to a reset pulse generator 68. If the reference pulse R is applied to the phase comparator 60 during the time interval that a vertical blanking pulse B is supplied at the other input thereto from the camera sync generator 22 the output 70 of the phase comparator 60 will be such as to not cause the reset pulse generator 68 to supply a set output 72 to the "525" divider 52. That is, as long as a reference pulse R occurs during the 1.25 millisecond time duration of the vertical blanking pulse B, the system is sufficiently in synchronism so that it is not necessary to take any corrective action. However, if a reference pulse R does not occur during the time duration of the vertical blanking pulse B, the phase comparator 60 will output a reset signal 70 to the reset pulse generator 68 which will supply a reset output 72 at the occurrence of the next occurring reference pulse R. The reset output 72 of the reset pulse generator 68 is operative to cause the "525" divider 52 to be set to a predetermined pulse count therein as will be discussed later so that the time at which the next vertical signal V is supplied from the camera sync generator 22 will be at such a time to cause the vertical blanking V to begin at a time approximately 0.667 milliseconds before the generation of the next reference pulse R. That is, the reference pulse R will occur at essentially the midpoint of the vertical blanking pulse B.

With the coincidence of a reference pulse R and a vertical blanking pulse B, the phase comparator output 70 will be such that the reset pulse generator 68 will not provide a set output 72 to the "525" divider 52 which will continue its counting operation from the then existing count.

It can thus be seen that if at startup upon closing the switch 36 should the synchronous motor 34 be so out of phase with respect to the zero-crossing point of the AC output 11 the "525"divider 52 will be so set in response to the operation of the phase comparator 60 and reset pulse generator 68 to adjust the generation of the vertical blanking pulse B so that the desired phase relationship is established with the AC output 11. As an alternative to the system shown the output 70 of the phase comparator 60 may be utilized to give an indication, such as lighting a lamp, that an out of phase condition exists, with the reset pulse generator being manually operated to provide the reset output 72 to the "525" divider 52.

Figure 2:
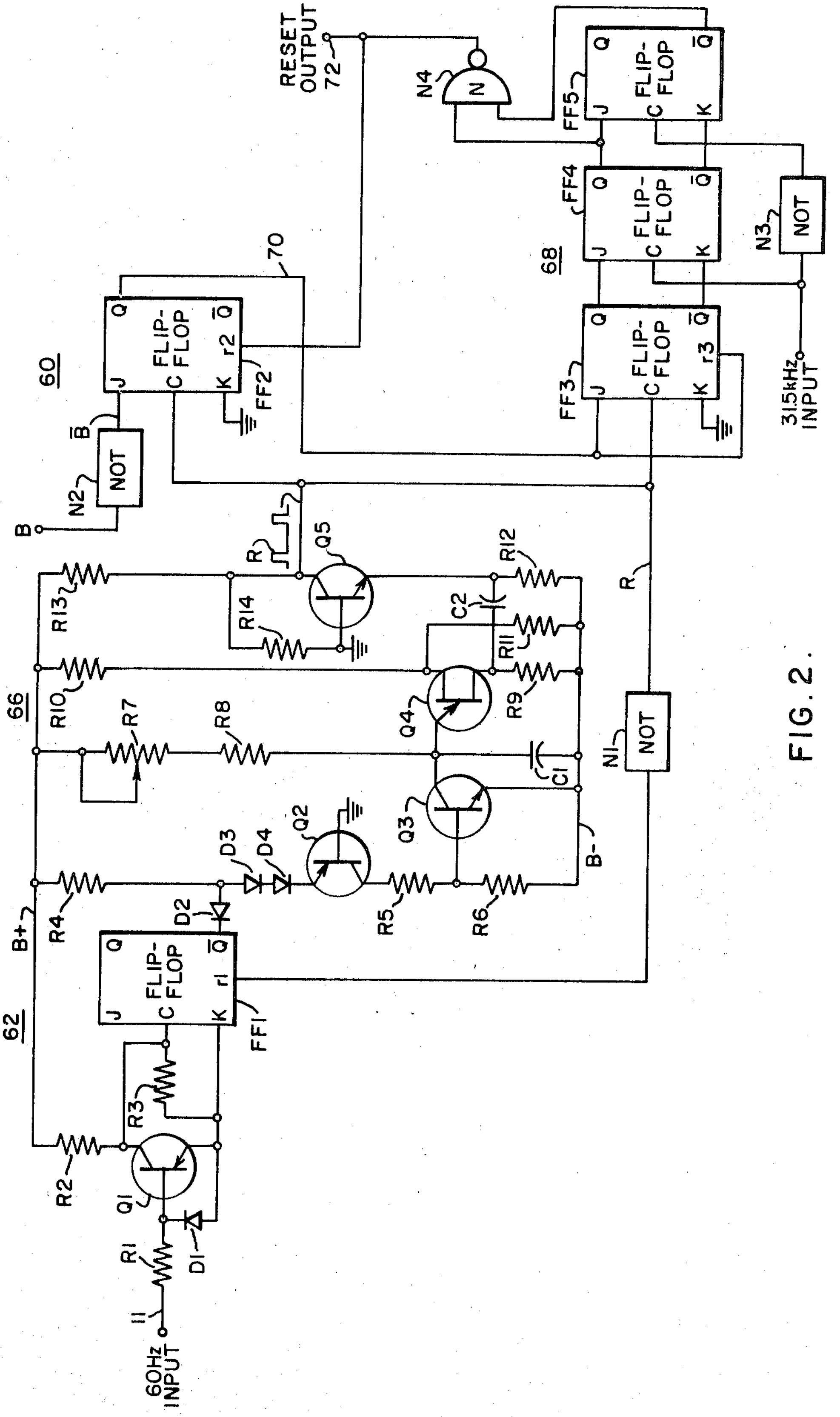
FIG. 2 is a schematic block diagram of a portion of the system of FIG. 1.

FIG. 2 shows a schematic diagram of the zero-crossing detector 62, the timer 66, the phase comparator 60 and the reset pulse generator 68 of FIG. 1. The AC output 11 is applied to the base of a transistor Q1 of the detector 62 which is of the PNP type, through a resistor R1. A clamping diode D1 is connected between the emitter and base of the transistor Q1 to clamp positive going signals. The collector of the transistor Q1 is connected via a resistor R2 to a source of direct operating potential B+. As the AC waveform at 11 crosses the zero axis and starts positive the transistor Q1 is turned on providing a substantially square wave output across a resistor R3 connected between the collector and emitter thereof having a frequency of 60 Hz. The collector of the transistor is connected to the clock input C of a JK flip-flop FF1. The JK flip-flop may comprise an integrated circuit designated master-slave flip-flop, SN 7473, by Texas Instruments, Inc. The truth table for such a flip-flop is as follows:

TABLE 1

| | $t_n$ | $t_{n+1}$ |
|---|---|---|
| J | K | Q |
| 0 | 0 | Qn |
| 0 | 1 | 0 |
| 1 | 0 | 1 |
| 1 | 1 | $\overline{Q}$n |

In the above table, J and K are the respective inputs, Q is the output and $\overline{Q}$ the compliment thereof, $t_n$ is the time immediately prior to a clock pulse input C and $t_{n+1}$ is the time immediately subsequent to a clock pulse C. The flip-flop is responsive to change states when a clock pulse changing from a ONE to a ZERO is applied thereto. As used herein, for the purpose of example, a ONE is considered to be a positive polarity signal and a ZERO is considered to be at ground potential.

When the transistor Q1 is turned on the flip-flop FF1 goes to its true state so that the $\overline{Q}$ output thereof is a ZERO. A diode D2 is connected between the $\overline{Q}$ output and B+ lines via a resistor R4. A transistor Q3 of the PNP type which was previously conductive being supplied current from the B+ source through the resistor R4 and a pair of diodes D3 and D4 to the emitter electrode thereof, is turned off by the change of output state $\overline{Q}$ of the flip-flop FF1. The base of the transistor Q2 is grounded and the collector thereof is connected via a resistor R5 to the base of a transistor Q3 of the NPN type. A resistor R6 is connected between the base and emitter electrodes of the transistor Q5 with the transistor Q3 also turning off in response to the turning off of the transistor Q2 previously receiving base current via the transistor Q2. A capacitor C1 in the timer 66 is connected between the collector and emitter electrodes of the transistor Q3 and is shorted when the transistor Q3 is turned on. A charging circuit including a potentiometer R7 and a resistor R8 is connected between the B+ line and top side of the capacitor C1. A unijunction transistor Q4 is provided and has its emitter electrode connected to the junction of the capacitor C1 and the collector of the transistor Q3. The first base of the unijunction transistor Q4 is connected via a resistor R9 to a B− line supplying negative DC operating potential for the circuitry. The second base is connected to the junction of a voltage divider including a resistor R10 and a resistor R11 connected between the B+ and B− lines.

When the transistor Q3 is turned off, the capacitor C1 begins to charge toward the positive B+ polarity at the emitter of the unijunction Q4. When the capacitor voltage reaches the breakover value of the unijunction Q4, the unijunction will fire causing a signal to be translated via the first base thereof through a capacitor C2 to the emitter electrode of a transistor Q5, which is of the NPN type. A resistor R12 is connected between the emitter of the transistor Q5 and the B− line. In response to the signal provided to the emitter of the transistor Q5, a positive going pulse signal is provided at the collector of the transistor Q5 which is the reference signal R as defined in FIG. 1 and shown in curve designated R on FIG. 2. The base of the transistor Q5 is grounded and the collector thereof is connected at the junction of a voltage divider including resistor R13 and a resistor R14 connected between the B+ source and ground. The resistors R12, R13 and R14 are so selected that transistor Q5 is normally conductive until a pulse is applied to the emitter electrode thereof which causes the collector thereof to go positive which supplies the positive going pulses R.

The reference pulses R are applied to the clock input C of a JK flip-flop FF3. The flip-flops FF2 and FF3 may be of the same type as that used for the flip-flop FF1. The reference pulses R are also applied to a NOT logic circuit N1 for inversion therein to provide an inverted output as shown which is applied to the reset input *r*1 of the flip-flop FF1 which resets the flip-flop FF1 to its original state so that the $\overline{Q}$ output thereof is a ONE which causes the diode D2 to block thereby permitting current to be supplied to the transistors Q2 and Q3. These transistors are thus turned on with the capacitor C1 being shorted by the transistor Q3 and the timer 66 being reset for its next timing cycle.

The vertical blanking pulses B are inverted in a NOT N2 and applied as a $\overline{B}$ input to the J input of the flip-flop FF2. The K input of the flip-flop FF2 is a ZERO being grounded. If the $\overline{B}$ input to the flip-flop FF2 is a ZERO at the time the reference signal R goes from a ZERO to a ONE to the clock input C of the flip-flop the output Q of the flip-flop FF2 will not change according to Truth Table I which would be set at a ZERO with the K input always being maintained as a ZERO. Thus the Q output 70 of the flip-flop FF2 would be at a ZERO level which is applied to the J input of the flip-flop FF3. Since the K input is grounded for the flip-flop FF3, a ZERO input applied to the J input will not cause the flip-flop FF3 to change in response to a clock input R being applied thereto. Thus the reset pulse generator 68 does not operate to generate a set output 72.

However, should the system be out of synchronism and a vertical blanking pulse does not occur at the time that the reference signal R is applied as a clock input to the flip-flop FF2 but rather the $\overline{B}$ signal is at a ONE rather than a ZERO level, at the occurrence of the signal R being applied to the clock input C of the flip-flop FF2 and a ONE $\overline{B}$ signal applied to the J input the output Q of the flip-flop FF2 will go to a ONE at the output 70 thereby supplying a ONE input to the J input of the flip-flop FF3. Thus, at the occurrence of the next reference signal R going from a ONE to a ZERO at the clock input to the flip-flop FF3, the output of the flip-flop FF3 will change so that Q will be a ONE and $\overline{Q}$ will be a ZERO. The Q and $\overline{Q}$ outputs of the flip-flop FF3 are respectively applied to the J and K inputs of a JK flip-flop FF4. The Q and $\overline{Q}$ outputs of the flip-flop FF4 are applied to the J and K inputs, respectively, of a flip-flop FF5. The 31.5 kHz. clock input 50 is applied to the clock input of the flip-flop FF4 and is also inverted in a NOT N3 and applied as the clock input to the flip-flop FF5. The Q output of the flip-flop FF4 is applied as one input to a NAND N4 and the $\overline{Q}$ output of the flip-flop FF5 is applied as the other input thereto with the output at the NAND N4 being the output of the reset generator 68 designated 72 in FIG. 1 which is applied as the reset input *r*2 for the flip-flop FF2 of the phase comparator 60. In response to the flip-flop FF3 changing states with the Q output thereof going to a ONE the flip-flops FF4 and FF5 and the NAND N4 produce a 15-microsecond pulse for each time that the flip-flop FF2 is operated in response to an input 70 thereto from the phase comparator flip-flop FF2. The pulse output 72 is at such a polarity to reset the flip-flop FF2 and also supply the set input to the "525" divider 52. The output 70 is from the flip-flop FF2 applied to the reset input *r*3 of the flip-flop FF3 which causes it to reset once that the pulse 70 reverts to a ZERO state.

Therefore, as long as the vertical blanking pulses B occur or exists during the time that a reference signal R is generated by a timer 66, the phase comparator flip-flop FF2 will not change output states, and hence the reset pulse generator 68 will not be operative. However, when the system is out of phase such as at startup when the synchronous motor 34 is initially energized, the vertical blanking pulses B may not occur or exist at the time that a reference pulse R is applied to the phase comparator 60. Thus the phase comparator flip-flop FF2 will output a ONE signal at 70 which will cause the flip-flop FF3 to change output states thereby instigating the generation of a 15-microsecond reset pulse via the flip-flops FF4 and FF5 and the NAND N4 which will supply a set input 72 to the "525" divider 52 of FIG. 1.

Figure 3:
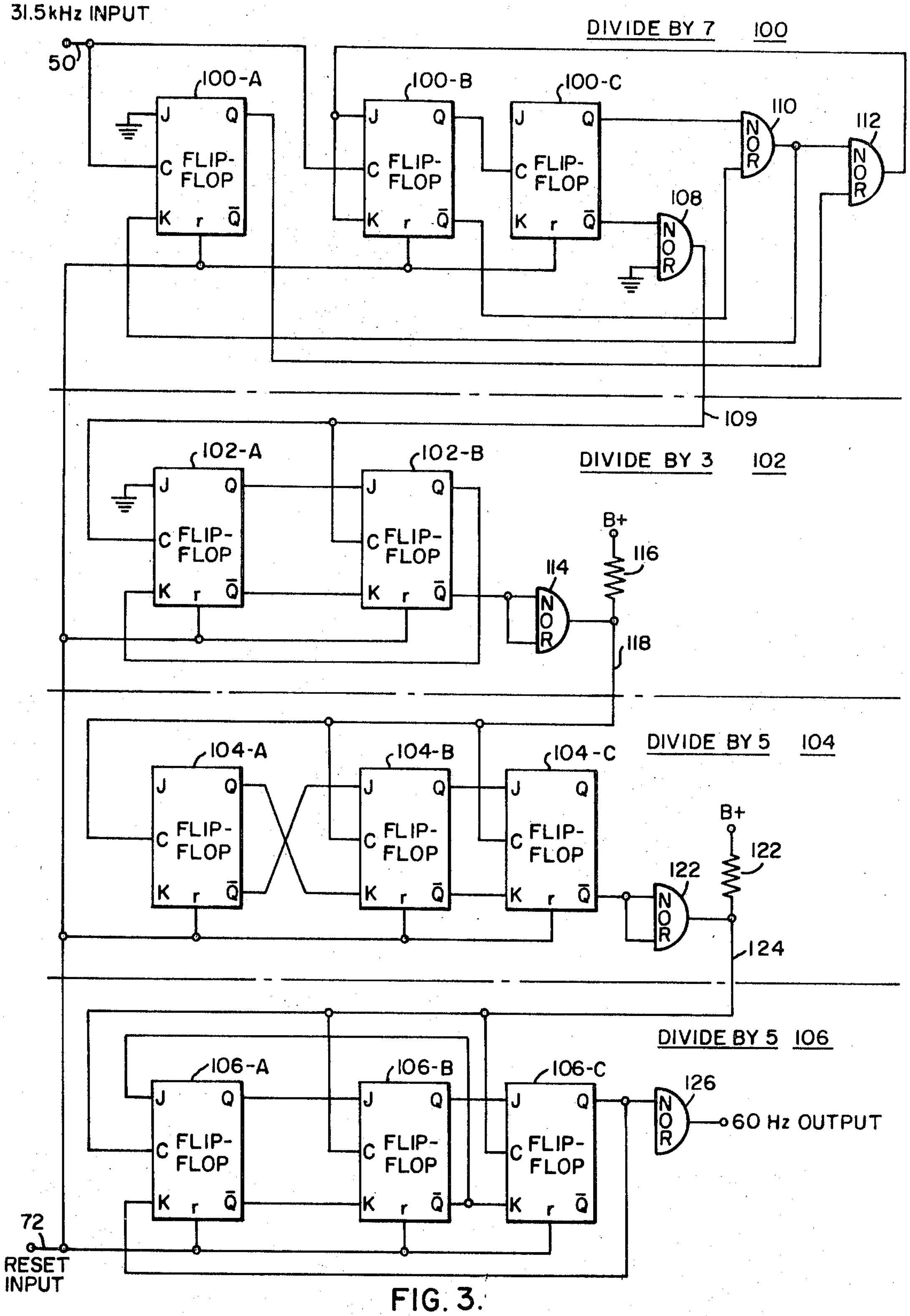
FIG. 3 is a block diagram in more detail of a portion of FIG. 1.

FIG. 3 shows a more detailed block diagram of the "525" counter of FIG. 1. The "525" divider 52 includes four stages. The first stage is a divide by seven stage 100; the second stage is a divide by three stage 102 and the third and fourth stages are, respectively, divide by five stages 104 and 106. The first stage 100 receives the 31.5 kHz. clock input 50 and divides this by seven so that for each seven pulses inputted at 50 one pulse will be outputted from output 108 of the divide by seven stage 100 to the input of the divide by three stage 102. The divide by seven stage 100 includes three JK flip-flops 100–A, 100–B and 100–C which may comprise dual JK flip-flops designated by Motorola Inc. as MC 890 and having the following truth table:

TABLE 2

| $t_n$ | | $t_{n+1}$ | |
|---|---|---|---|
| J | K | Q | $\overline{Q}$ |
| 1 | 1 | Q | $\overline{Q}$ |
| 1 | 0 | 1 | 0 |
| 0 | 1 | 0 | 1 |
| 0 | 0 | $\overline{Q}$ | Q |

In this table, the symbols have the same meaning as in Table 1, with a clock pulse changing from a ONE to a ZERO causing a change in output states. The stage 100 also includes three NOR logic circuits 108, 110 and 112. The interconnection as shown for the divide by seven stage 100 are standard for providing a divide by seven pulse count division operation.

The divide by three stage 102 includes two JK flip-flops 102–A and 102–B and a NOR 114. The stage 102 is connected in a standard divide by three pulse division configuration except that the NOR 114 is provided with dual inputs and a loading power supply including a resistor 116 connected between the output and B+ supply. Such a configuration is required because of the number of stages driven from the stage 102. For every three pulse inputs to the stage 102 from the output 108 of stage 100, one pulse is provided at the output 118 thereof so that one pulse is provided at 118 for each 21 pulses inputted at 50 to the input stage 100.

The divide by five stage 104 includes three JK flip-flops 104–A, 104–B and 104–C and a NOR 120. As in stage 102 the NOR 120 has dual inputs and a resistor 122 connected between the output of the NOR and a B+ source for loading purposes. The stage 104 is connected in a standard divide by five configuration except that the Q outputs of the flip-flop 104–A goes to the K input of the flip-flop 104–B and the $\overline{Q}$ output of the flip-flop 104–A goes to the J input of the flip-flop 104–B. This is compared to the standard configuration for a divide by five counter as shown in stage 106 which includes JK flip-flops 106–A and 106–B wherein the Q output and J input and $\overline{Q}$ output and K input are respectively coupled. The purpose for cross coupling the outputs of the stage 104–A is for setting the third stage 104 to the proper count in response to a set signal input 70 thereto as will be discussed below in further detail. The output 124 of the stage 104 provides one pulse in response to 105 pulses being inputted at 50 from the 31.5 kHz. source.

The fourth stage 106 includes the JK flip-flops 106–A, 106–B, 106–C and a NOR 126 and is connected in a standard configuration to provide a divide by five pulse count division operation with respect to input 124 so that one output pulse is provided at the output 56 for every 525 pulses inputted at 50 into the divider 52. Since the input to the counter is at 31.5 kHz. by dividing by 525 the output at 56 from the divider would be at a 60 Hz. rate. All of the JK flip-flops of the divider 52 may comprise those having a truth table such as shown in Table 2.

Each of the JK flip-flops in the four stages 100, 102, 104 and 106 receive the reset output 72 from the pulse generator 68 as a reset input thereto. The reset input 72 resets the stages 100, 102 and 106 to a zero count level. However, in that the Q and $\overline{Q}$ outputs of the flip-flop 104–A of the stage 104 are cross coupled instead of the stage 104 being reset to a zero count it is set to a one count. This is just as if at the time that the reset pulse 72 is applied to the divider that 21 pulses have already been inputted at 50 so that a one count has just been entered into the third stage 104 in response thereto. The counting operation in the "525" divider 52 upon the application of a reset impulse 72 thereto begins with a one input set into the third stage 103 and the counting operation will continue from this point. The reason for this is to center the generation of the vertical blanking pulses B about the time at which the reference pulses R are generated so that ideally the reference pulses occur at approximately impulse milliseconds after a vertical blanking pulse B has begun.

This may be seen to be the proper setting of the "525" divider 52 from the following analysis. At a frequency of 31.5 kHz. a period for one cycle is approximately 0.0317 milliseconds. Thus for 21 cycles to occur requires 0.6657 milliseconds which as previously discussed is approximately the time for one-half the vertical blanking pulse having a total period of 1.25 milliseconds to have elapsed. Hence, setting the third stage 104 to have a one count is equivalent to 21 cycles having occurred of the 31.5 kHz. input 50. The output 56 of the "525" divider 52 is thereby so adjusted that the camera sync generator 52 will provide the blanking pulse output B at the proper time to be centered above the reference signals R which are generated in response to the input AC source 10.

Since the vertical blanking pulses B have a time duration of approximately 1.25 milliseconds it is possible that the phasing of the vertical blanking pulses B with respect to the AC output 11 may vary over a range of approximately ±13.5° before being sufficiently out of phase to cause the phase comparator flip-flop FF2 to change output states thereby initiating the generation of a set pulse 72 from the reset pulse generator 68. When, however, the vertical blanking pulses and AC input 11 are more than 13.5° out of phase, then a reset pulse 70 will be generated for application to the "525" divider 52 to set the third stage 104 thereof to a one count so that the vertical blanking pulse next generated will be centered about a corresponding reference signal R supplied by the timer 66.

Although the present invention has been described with a certain degree of particularity, it should be understood that the present disclosure has been made only by way of example and that numerous changes in the details of circuitry and the combination and arrangement of parts, elements and components can be resorted to without departing from the spirit and scope of the present invention.

We claim as our invention:

1. In a system for correlating recorded synchronizing information prerecorded on a first track of a recording disc with input alternating signals for driving said recording disc wherein video information is recorded on a second track of said recording disc under the control of said recorded synchronizing information, the combination of:

means responsive to a characteristic of said input alternating signals for providing reference signals having a predetermined relationship with said input alternating signals;

means responsive to said recorded synchronizing information for providing timing signals;

means for comparing said timing signals and said reference signals and providing an output when the occurrence of said timing signals and said reference signals have an undesired relationship; and means for correcting the time at which said timing signals occur in response to said output so that a desired relationship between said timing and reference signals is established.

2. The combination of claim 1 wherein:

said recorder synchronizing information has a predetermined clock frequency, said means responsive to said recorded synchronizing information comprises divider means for dividing said recorded synchronizing information by a predetermined divisor to provide said timing signals at a desired frequency equal to said predetermined clock frequency divided by said predetermined divisor.

3. The combination of claim 2 wherein:

said desired frequency of said timing signals is at the vertical scanning rate of said video information.

4. The combination of claim 3 wherein:

said video signals are supplied from a television camera, said timing signals comprise vertical blanking signals having a predetermined time duration.

5. The combination of claim 4 wherein:

said divisor means is reset to a selected state in response to said output so that said vertical synchronizing signals may deviate from the desired relationship by a predetermined amount before said output is given by said means for comparing.

* * * * *